US008879080B2

(12) United States Patent
Kogoshi

(10) Patent No.: US 8,879,080 B2

(45) Date of Patent: Nov. 4, 2014

(54) ELECTRONIC DEVICE COMPRISING DISPLAY SECTIONS CONFIGURED TO FACE IN DIFFERENT DIRECTIONS

(75) Inventor: Takahiro Kogoshi, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/597,358

(22) Filed: Aug. 29, 2012

(65) Prior Publication Data

US 2013/0057889 A1 Mar. 7, 2013

(30) Foreign Application Priority Data

Sep. 6, 2011 (JP) ................................ 2011-193724

(51) Int. Cl.

| | |
|---|---|
| ***G06F 3/12*** | (2006.01) |
| ***G06Q 20/00*** | (2012.01) |
| ***G07G 5/00*** | (2006.01) |
| ***G07G 1/00*** | (2006.01) |
| ***G07G 1/12*** | (2006.01) |

(52) U.S. Cl.

CPC ................ *G07G 1/0018* (2013.01); *G07G 5/00* (2013.01); *G07G 1/12* (2013.01)

USPC ......... 358/1.13; 358/1.1; 705/16; 361/679.27

(58) Field of Classification Search

None

See application file for complete search history.

(56) References Cited

U.S. PATENT DOCUMENTS 7,466,306 B2 * 12/2008 Connor et al. ................ 345/169
2002/0141146 A1 * 10/2002 Mustoe ......................... 361/683
2005/0134524 A1 * 6/2005 Parker et al. ................... 345/1.1
2006/0198094 A1 * 9/2006 Kano et al. ..................... 361/683
2011/0134482 A1 * 6/2011 Baitz et al. ................... 358/1.15

FOREIGN PATENT DOCUMENTS

| | | |
|---|---|---|
| JP | 05-325048 | 12/1993 |
| JP | 06-004778 | 1/1994 |
| JP | 06-161703 | 6/1994 |
| JP | 2003-317150 | 11/2003 |
| JP | 2005-202875 | 7/2005 |
| JP | 2007-156973 | 6/2007 |
| JP | 2011-096126 | 5/2011 |

OTHER PUBLICATIONS

Japanese Office Action for Japanese Application No. 2011-193724 mailed on Jul. 16, 2013.

* cited by examiner

*Primary Examiner* — Thomas Lett

(74) *Attorney, Agent, or Firm* — Amin, Turocy & Watson, LLP

(57) ABSTRACT

An electronic device comprises a main body, a printing section which is arranged in the main body and prints various information onto a continuous-feed paper, a first display section which is arranged rotatably between a first position where the upper part of the printing section is covered and a second position where the upper part of the printing section is opened at the position adjacent to the printing section of the main body and a second display section which faces to a direction different from the first display section and is connected to the first display section, and abuts against the printing section or the main body in a state of the first display section being located in the first position, and controls the rotation of the first display section towards the printing section side is controlled.

6 Claims, 6 Drawing Sheets

ELECTRONIC DEVICE COMPRISING DISPLAY SECTIONS CONFIGURED TO FACE IN DIFFERENT DIRECTIONS

CROSS-REFERENCE TO RELATED APPLICATION

This application is based upon and claims the benefit of priority from Japanese Patent Application No. 2011-193724, filed Sep. 6, 2011, the entire contents of which are incorporated herein by reference.

FIELD

Embodiments described herein relate to an electronic device.

BACKGROUND

Previously, in a supermarket or a retail store, in order to conduct a merchandise sale data processing, an electronic device such as a POS (Point Of Sales) terminal with a screen for operator and a screen for customer is used.

The POS terminal is a terminal which is arranged in a clearing area and used for a cashier conducting a sales processing, a keyboard is arranged in the upper side of its main body.

In the vicinity of approximate middle of the upper side of the main body, the display section for salesclerk is arranged in a manner that it faces to the keyboard side and being able to adjust an angle in a vertical direction via a shaft. In the vicinity of the end of the back side of the upper side of the main body, a display section for customer is arranged in a manner that it faces to the opposite side of the display section for salesclerk and an angle in a horizontal direction can be adjusted via a shaft.

In the interior of the main body of the POS terminal and in the vicinity of a keyboard, a receipt printer and a journal printer are arranged side by side in parallel at the superior surface of the main body. A cover used for transport of a continuous-feed paper into and from the receipt printer and a cover used for transport of a continuous-feed paper into and from the journal printer are arranged side by side in the superior surface of the main body. In addition, a receipt outlet of the receipt printer is arranged in the cover.

DETAILED DESCRIPTION

In accordance with an embodiment, an electronic device comprises a main body, a printing section which is arranged in the main body and prints various information onto a continuous-feed paper, a first display section which is arranged rotatably between a first position where the upper part of the printing section is covered and a second position where the upper part of the printing section is opened at the position adjacent to the printing section of the main body and a second display section which faces to a direction different from the first display section and is connected to the first display section, and abuts against the printing section or the main body in a state of the first display section being located in the first position, and controls the rotation of the first display section towards the printing section side is controlled.

Hereinafter, the POS terminal as the example of the electronic device according to the embodiment is illustrated with reference to FIGS. 1-6.

Figure 1:
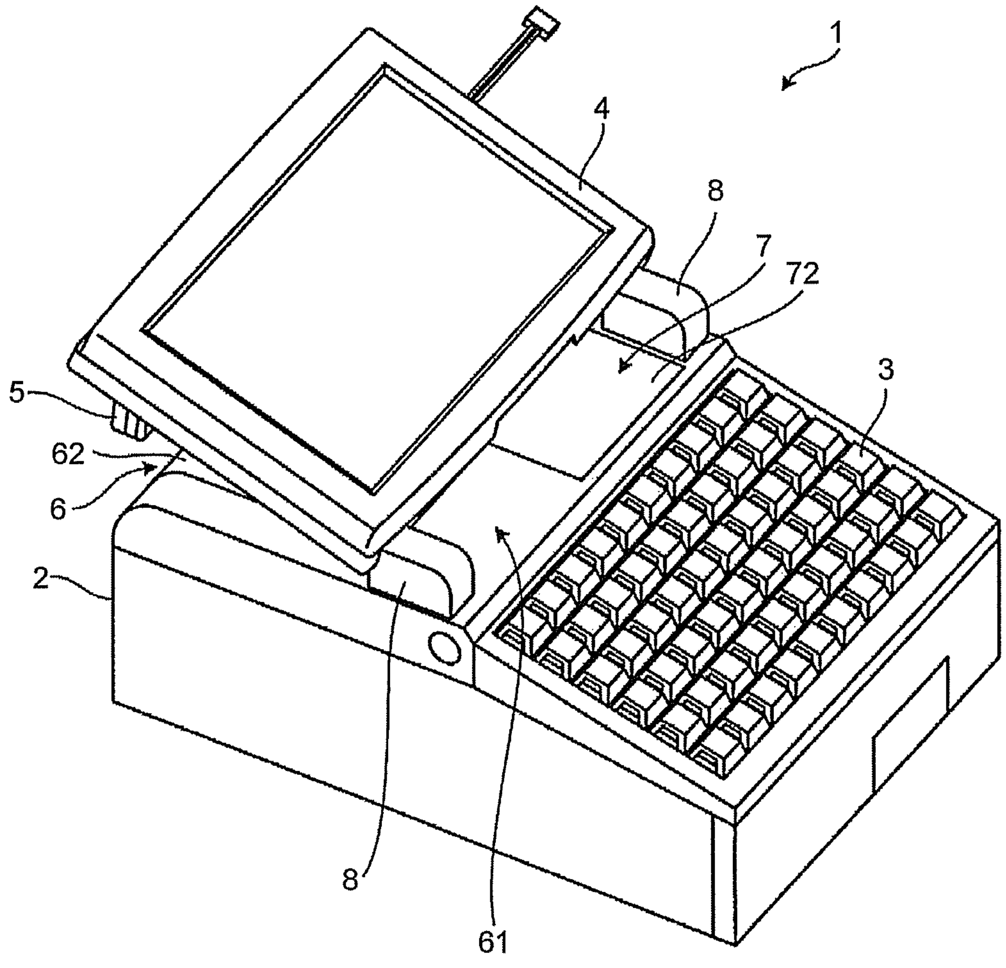
FIG. 1 is a front perspective view showing the POS terminal according to the present embodiment.
Figure 2:
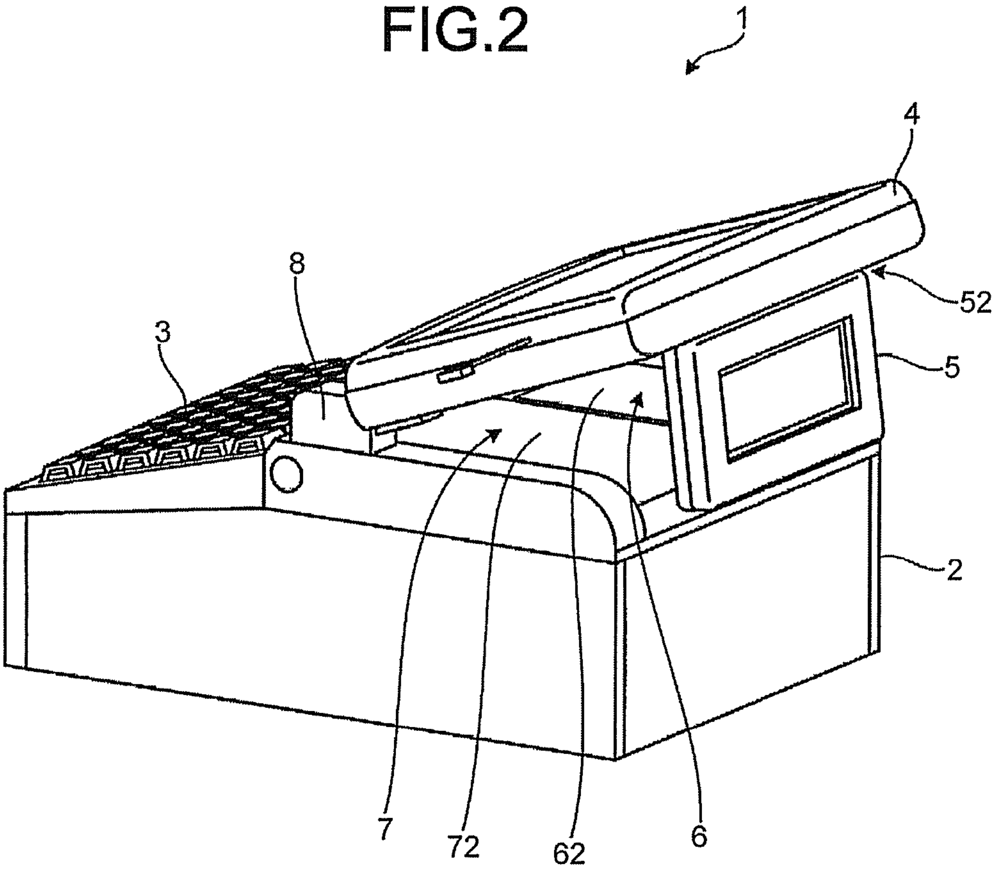
FIG. 2 is a back perspective view of the above-described POS terminal.

FIGS. 1 and 2 are the front perspective view and the back perspective view showing a schematic brief configuration of the POS terminal according to the embodiment.

POS terminal 1 is an electronic device which is installed at a paying area of a shop and used for conducting registration processing and account processing of customer purchased commodity. As shown in FIGS. 1 and 2, the POS terminal 1 includes a main body 2, a keyboard 3, a display section for salesclerk (first display section) 4, a display section for customer (second display section) 5, a connecting member 8, a receipt printer 6, and a journal printer 7.

In the interior of the main body 2, an information processing section (not shown) which conducts various information processing or a storage section (not shown) which stores various information are arranged.

At one end of the upper side of the main body 2, the keyboard 3 as the input section which has various function keys such as a numerical keypad etc. for the salesclerk conducting various operations is arranged.

At one side of the upper side of the main body 2 and at the position adjacent to the keyboard 3 and the receipt printer 6 and the journal printer 7, a connecting member 8 is arranged. The connecting member 8 is connected to the main body 2 via a first shaft 81 (referring to FIGS. 4 to 6) in a manner of being able to rotate in a front-back direction (a direction in which the keyboard 3 is connected with the receipt printer 6 or the journal printer 7) meanwhile the connecting member 8 is connected via the second shaft 82 (referring to FIGS. 4 to 6) to the display section for salesclerk 4 in a manner of being able rotate in the front-back direction.

At the upper side of the main body 2 and at the position adjacent to the keyboard 3 and the receipt printer 6 and the journal printer 7, the display section for salesclerk 4 which displays various information such as processing details etc. to the salesclerk is installed via two connecting member 8 in a manner of being able to rotate in a front-back direction. Then, the power supply or various display data are provided from the main body 2 via the connecting member 8 to the display section for salesclerk 4. In addition, a given resistance force is applied against the rotation motion of the second shaft 82. By the resistance force, the display section for salesclerk 4 can adjust the angle relative to the connecting section 8 and can maintain a given angle.

The display section for customer 5 is connected to the end of the opposite side to the side which is connected to the connecting member 8 of the display section for salesclerk 4 via a shaft 52 in a manner of being able to rotate in the front-back direction. In usual usage state of the POS terminal 1, the display section for customer 5 is located above the receipt printer 6 and the journal printer 7 described below.

The display section for customer 5 displays various information such as purchased goods or billing amount etc. to the customer. The power supply or various display data are provided from the main body 2 via the connecting member 8 and the display section for salesclerk 4 to the display section for customer 5. Because of this, even if the display section for customer 5 is directly arranged above the main body 2, the power supply or various display data can be provided. In addition, a given resistance force is applied against the rotation motion of the shaft 52. By the resistance force, the display section for customer 5 can adjust the angle relative to the display section for salesclerk 4 and can maintain a given angle.

The display section for customer 5 is continuously arranged in the display section for salesclerk 4, thereby it is unnecessary to ensure a space for arranging the display section for customer 5 in the upper side of the main body 2, and the POS terminal 1 can be downsized with respect to the planar direction.

In usual usage state of the POS terminal 1, the display section for customer 5 is located above the receipt printer 6 and the journal printer 7 described below and does not project from the main body 2 in the planar direction. Therefore, the POS terminal 1 can be downsized with respect to the planar direction.

Figure 3:
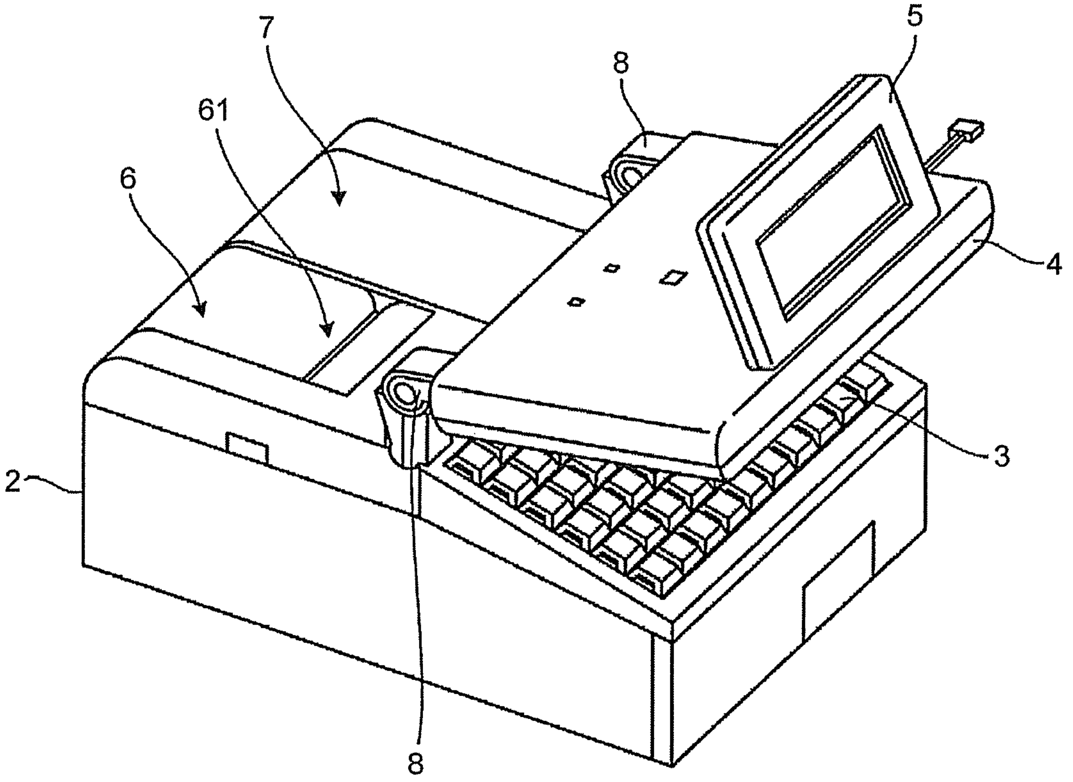
FIG. 3 is a front perspective view showing a state in which the display section for salesclerk of the above-described POS terminal is reversed.

As shown in FIGS. 1 to 3, at lower part of the display section for salesclerk 4 and at the position adjacent to the keyboard 3, the receipt printer 6 and the journal printer 7 are arranged side by side in the planar direction.

The receipt printer 6 prints purchased commodity items or their total amount etc. onto the continuous-feed paper and sends it out as the receipt. The receipt printer 6 includes a storage section (not shown) which stores the roll shaped continuous-feed paper in its interior; a printing section (not shown) which prints onto the continuous-feed paper; a paper feed section (not shown) which transports the continuous-feed paper from the storage section through the printing section to the exterior of the receipt printer 6; a cover 62 which covers these components. The receipt made by printing onto the continuous-feed paper is ejected from the receipt outlet 61 arranged in the cover 62.

The journal printer 7 prints data such as one-day sales result etc. stored in the storage section arranged in the interior of the main body 2 of the POS terminal 1 onto the continuous-feed paper and sends it out as the journal. The journal printer 7 includes a storage section (not shown) which holds the roll shaped continuous-feed paper in its interior; a printing section (not shown) which prints onto the continuous-feed paper; a winding section (not shown) which rewinds the print finished continuous-feed paper to a roll shape; and a cover 72 which covers these sections.

The receipt printer 6 and the journal printer 7 are arranged adjacent to the keyboard 3. Therefore, the POS terminal can be downsized in the planar direction.

In order to downsize the POS terminal 1 in the planar direction, the components are arranged adjacent to each other in the planar direction meanwhile it is preferred that the components are arranged in a manner of being within the superior surface of the main body 2 in the planar direction, that is, not projecting from the main body 2 in the planar direction. On the other hand, in order to ensure the operability of the keyboard 3, it is be necessary to leave a given interval between the display section for salesclerk 4 and the keyboard 3.

Figure 4:
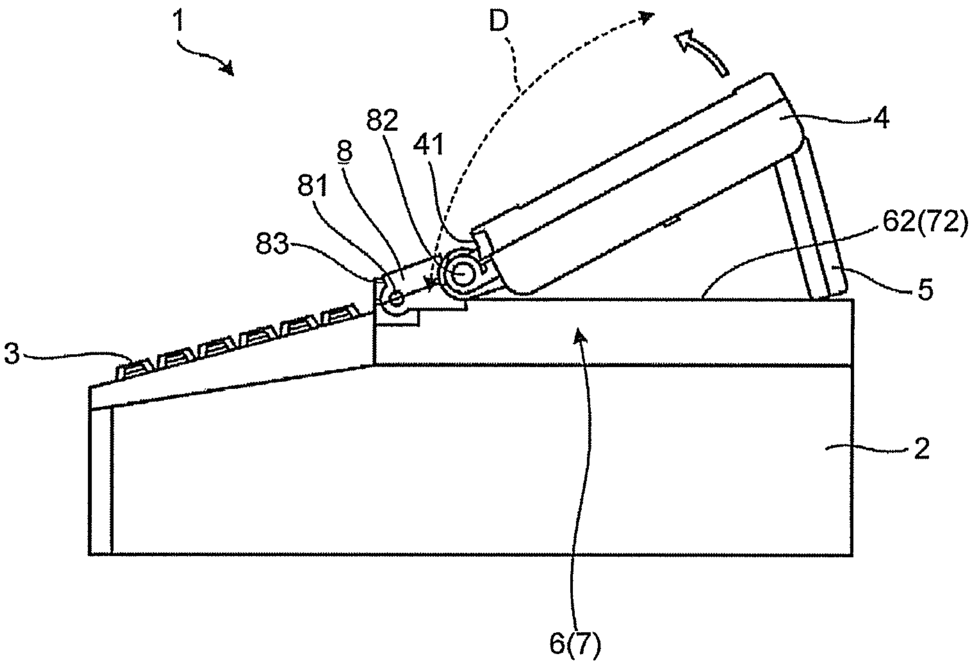
FIG. 4 is a side view showing a usage state of the above-described POS terminal.

Therefore, in case that the display section for salesclerk 4 is parted from the keyboard 3 and the display section for salesclerk 4 rotates in a direction covering the upper sides of the receipt printer 6 and the journal printer 7, the POS terminal 1 according to the present embodiment is configured in a manner that the display section for customer 5 abuts the main body 2 or the cover 62, 72 (referring to FIGS. 1, 2, and 4). That is, the rotation of the display section for salesclerk 4 towards the direction seceding from the keyboard 3 is conducted only to a position (first position) where the display section for customer 5 abuts the main body 2 or the cover 62, 72, and the rotation is controlled not to surpass the position.

Because of this, the rotation of the display section for salesclerk 4 can be controlled such that it is within the range in which the display content is easy to be seen by the salesclerk. In addition, in the case that the display section for customer 5 moves with the rotation of the display section for salesclerk 4, the display section for customer 5 is constantly within the superior surface of the main body 2 in the planar direction, and does not project from the main body 2. Therefore, the increase in size of the POS terminal 1 in the planar direction is effectively prevented, and a configuration with excellent space-saving property is obtained.

The display section for salesclerk 4 is arranged at the upper part of the main body 2 via the connecting member 8 arranged adjacent to the keyboard 3. That is, at the upper part of the main body 2, only the keyboard 3, the connecting member 8, the receipt printer 6 and the journal printer 7 are arranged adjacent to each other, and a configuration with excellent space-saving property in the planar direction is obtained.

The display section for salesclerk 4 is arranged in the main body 2 via the connecting member 8, accordingly in the usual usage state (referring to FIG. 1), in the display section for salesclerk 4 only the connecting member 8 offsets with respect to the keyboard 3, accordingly the operability of the keyboard 3 can be insured.

The rotation of the display section for salesclerk 4 of the POS terminal 1 according to above-described embodiment is illustrated with reference to FIGS. 4-6.

FIG. 4 is a side view of the usual usage state of the POS terminal 1. At this time, the display section for salesclerk 4 of the POS terminal 1 faces to the salesclerk side meanwhile the display section for customer 5 faces to the customer side. In addition, in this state, passing through the space formed by the main body 2 and the connecting section 8 and the display section for salesclerk 4, a state in which the receipt outlet 61 is exposed to the salesclerk side is obtained (referring to FIG. 1).

Because of this, the salesclerk can take out with hand the receipt ejected from the receipt outlet 61 which is below the display section for salesclerk 4 through a space formed by the main body 2 and the connecting member 8 and the display section for salesclerk 4.

However, in the state of FIG. 4, the display section for salesclerk 4 covers the upper side of the receipt printer 6 and the journal printer 7, and the display section for salesclerk 4 is at the position within the motion range D of the cover 62 of the receipt printer 6 and the cover 72 of the journal printer 7. Therefore, in this state, if the cover 62, 72 are opened they will contact with the lower hem of the display section for salesclerk 4, accordingly the cover 62, 72 cannot be opened and closed, and the roll paper cannot be transported into and from the receipt printer 6 or the journal printer 7.

Therefore, in the case that when the roll paper is transported into and from the receipt printer 6 or the journal printer 7 the cover 62, 72 must be opened and closed, the display section for salesclerk 4 must be evacuated out of the motion range D of the cover 62, 72.

Figure 5:
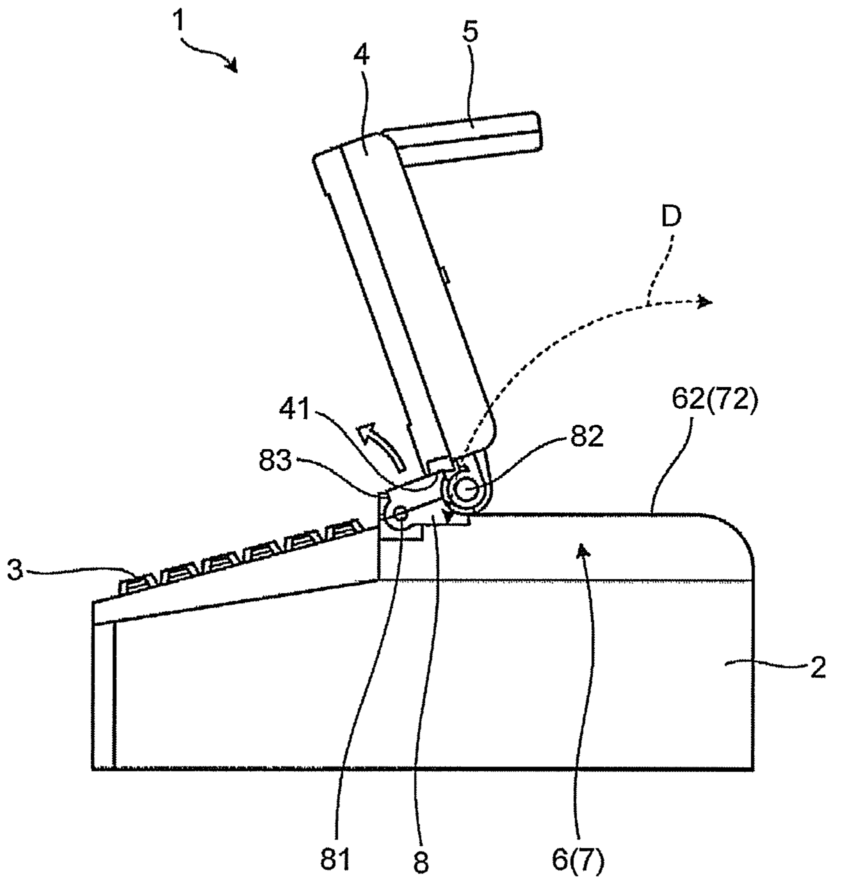
FIG. 5 is a side view showing a halfway state in which the display section for salesclerk of above-described POS terminal is reversed.

In order to evacuate the display section for salesclerk 4 out of the motion range D of the cover 62, 72, first, as shown in FIG. 5, the display section for salesclerk 4 is made to rotate and stand up via the second shaft 82 towards the keyboard 3.

At this time, the lower hem 41 of the rotated display section for salesclerk 4 abuts against the connecting member 8, thereby the rotation of the display section for salesclerk 4 is controlled to a given angle meanwhile this state is maintained by the resistance force against the rotation of the second shaft 82. In addition, the display section for customer 5 which is connected to the display section for salesclerk 4 also moves with the movement of the display section for salesclerk 4, and the display section for customer 5 evacuates out of the motion range D of the cover 62, 72.

Figure 6:
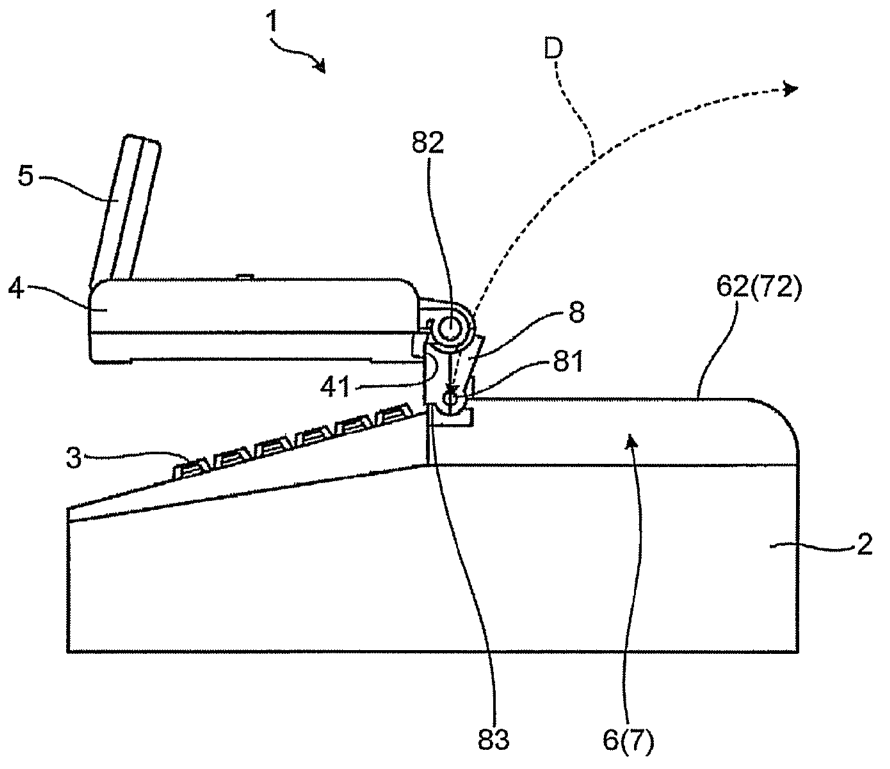
FIG. 6 is a side view showing a state in which the display section for salesclerk of above-described POS terminal is reversed.

As shown in FIG. 6, the connecting member 8 is made to rotate and stand up via a first shaft 81 towards the keyboard 3. At this time, because the end face 83 of the connecting member 8 abuts against the superior surface of the main body 2, the rotation of the connecting member 8 via the first shaft 81 is controlled in a state to the given angle, accordingly the rotation of the display section for salesclerk 4 is also controlled. That is, the rotation of the display section for salesclerk 4 towards the keyboard 3 is controlled at a given position (second position). Then, the display section for salesclerk 4 is configured in a manner of being able to rotate between the above-described first position and the above-described second position.

Thus, the display section for salesclerk 4 further moves from the state of FIG. 5 towards the keyboard 3 side thereby evacuates out of the motion range D of the cover 62, 72, and the upper sides of the receipt printer 6 and the journal printer 7 are opened. In addition, following the display section for salesclerk 4, the display section for customer 5 also further moves from the state of FIG. 5 towards the keyboard 3 side, but in the case the display section for salesclerk 4 is at the second position, the display section for customer 5 is constantly within the superior surface of the main body 2 and dose not project from the main body 2 in the planar direction. Therefore, increase in size of the POS terminal 1 in the planar direction is effectively prevented, and a configuration with excellent space-saving property is obtained.

Then, the display section for salesclerk 4 and the display section for customer 5 both evacuate out of the motion range D of the cover 62, 72, accordingly the cover 62, 72 can be opened and closed, and a state in which the roll paper can be transported into and from the receipt printer 6 or the journal printer 7 is obtained. In addition, in this state, a given interval is formed between the display section for salesclerk 4 and the keyboard 3 by the connecting member 8, accordingly an incorrect operation of the keyboard 3 due to contact of the display section for salesclerk 4 can be prevented.

In accordance with the POS terminal 1 according to the above-described embodiment, the display section for salesclerk 4 rotates and stands up towards the keyboard 3 via the second shaft 82, and the connecting member 8 further rotates and stands up towards the keyboard 3 via the first shaft 81. Thus, in the usual usage state, the display section for salesclerk 4 and the display section for customer 5 connected therewith which are located within the motion range D of the cover 62, 72 can evacuate out of the motion range of the cover 62, 72.

Because of this, in the usual usage state, the display section for salesclerk 4 and the display section for customer 5 can be arranged in a manner of being located within the motion range D of the cover 62, 72. That is, previously, the display section for salesclerk 4 and the display section for customer 5 are arranged out of the motion range D, accordingly the given space required between the display section for salesclerk 4 and the display section for customer 5 and the cover 62, 72 can be omitted, and the POS terminal 1 can be downsized in the planar direction.

When the display section for salesclerk 4 and the display section for customer 5 evacuate out of the motion range D of the cover 62, 72, first, the display section for salesclerk 4 and the connecting member 8 are folded around the second shaft 82 as the center, accordingly a compact state in which the display section for salesclerk 4 are adjacent to connecting member 8 is obtained. Then, the display section for salesclerk 4 and the connecting member 8 which have become to the compact state are moved by the rotation movement in which the first shaft 81 is the center, accordingly the motion range when the display section for salesclerk 4 and the display section for customer 5 evacuate out of the motion range D of the cover 62, 72 can be reduced. In this way, the motion range between the display section for salesclerk 4 and the display section for customer 5 becomes smaller, accordingly the space required for installation of the POS terminal 1 can be reduced.

The above-described embodiment is presented as an example, it is not intended to limit the scope of the invention. The novel embodiment can be implemented in other various forms, and various omissions, replacements, and modifications can be done without departing from the gist of the invention. The embodiment or its variation is included in the scope or the gist of the invention meanwhile included in the invention recited in the claims and its equivalent.

For example, in the above-described embodiment, the display section for salesclerk is connected to the main body by two connecting members, but the invention is not limited to this, for example it may be connected by using one or three or more connecting members. In this case, the POS terminal can also be downsized with respect to the planar direction.

In the above-described embodiment, the keyboard as an input section is arranged at the upper part of the main body, but it may be omitted, and the display section for salesclerk may be used as a touch panel which also functions as the input section.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:

a main body;

a printing section which is arranged in the main body and prints various information onto a continuous-feed paper;

a first display section which is arranged rotatably between a first position where an upper part of the printing section is covered and a second position where the upper part of the printing section is opened at a position adjacent to the printing section of the main body; and a second display section which is connected to an end of an opposite side to a side which is connected to the main body of the first display section, and is within a superior surface of the main body without projecting upward from the end of the opposite side of the first display section to face to a direction different from the first display section and abut against the printing section or the main body in a state of the first display section being located in the first position, and controls a rotation of the first display section towards a printing section side such that the end of the opposite side of the first display section is higher than the side which is connected to the main body of the first display section in a height direction of the main body.

2. The electronic device according to claim 1, wherein the first display section moves towards the second position, facilitating the continuous-feed paper to be transported into and from the printing section.

3. The electronic device according to claim 1, wherein the main body includes a input section, and the first display section rotates towards a side of the input section facilitating a state of being located at the second position to be obtained, and in a state of the first display section being located at the second position, the first display section parts from the input section.

4. The electronic device according to claim 1, wherein the second display section is rotatably connected with the first display section.

5. The electronic device according to claim 1, wherein display data is provided from the main body to the second display section via the first display section.

6. The electronic device according to claim 1, wherein the continuous-feed paper which is printed and ejected from the printing section passes though the lower side of the first display section and is fed to the second position in a state of the first display section being located at the first position.

* * * * *